United States Patent [19]
Edler et al.

[11] Patent Number: 5,187,129
[45] Date of Patent: * Feb. 16, 1993

[54] PROCESS FOR MAKING SILICON NITRIDE AND POWDERS AND ARTICLES MADE THEREFROM

[75] Inventors: James P. Edler; Bohdan Lisowsky, both of Troy, Mich.

[73] Assignee: Eaton Corporation, Cleveland, Ohio

[*] Notice: The portion of the term of this patent subsequent to Jul. 24, 2007 has been disclaimed.

[21] Appl. No.: 558,109

[22] Filed: Jul. 24, 1990

Related U.S. Application Data

[63] Continuation-in-part of Ser. No. 135,864, Dec. 21, 1987, Pat. No. 4,943,401.

[51] Int. Cl.$^5$ .................................................. C04B 35/58
[52] U.S. Cl. .................................... 501/97; 501/98; 264/63
[58] Field of Search ................ 501/97, 98; 264/63, 264/65, 66, 86; 423/344

[56] References Cited

U.S. PATENT DOCUMENTS

| | | | |
|---|---|---|---|
| 779,474 | 7/1855 | Schifferli, Jr. | 264/86 |
| 2,268,589 | 1/1942 | Henny | 49/78.1 |
| 2,869,215 | 1/1959 | Smith | 25/156 |
| 3,205,080 | 9/1965 | Ryshkewitch | 106/44 |
| 3,222,438 | 12/1965 | Parr et al. | 264/66 |
| 3,669,723 | 6/1972 | Parr et al. | 427/133 |
| 3,819,786 | 6/1974 | Wells May | 264/63 |
| 3,887,412 | 6/1975 | Styhr et al. | 156/89 |
| 3,950,464 | 4/1976 | Masaki | 264/65 |
| 3,991,166 | 11/1976 | Jack et al. | 423/327 |
| 3,992,497 | 11/1976 | Terwilliger et al. | 264/56 |
| 4,033,400 | 7/1977 | Gurwell et al. | 29/191.4 |
| 4,036,653 | 7/1977 | Jacobson | 106/47 R |
| 4,062,102 | 12/1977 | Lawrence et al. | 29/572 |
| 4,067,943 | 1/1978 | Ezis et al. | 264/86 |
| 4,119,689 | 10/1978 | Prochazka et al. | 264/65 |
| 4,164,528 | 8/1979 | Yajima et al. | 264/62 |
| 4,235,857 | 11/1980 | Mangels | 423/344 |
| 4,285,895 | 8/1981 | Mangels et al. | 264/65 |
| 4,354,990 | 10/1982 | Martinengo et al. | 264/65 |
| 4,356,136 | 10/1982 | Mangels | 264/65 |
| 4,376,742 | 3/1983 | Mah | 264/85 |
| 4,377,542 | 3/1983 | Mangels et al. | 264/65 |
| 4,388,080 | 6/1983 | Kapur et al. | 23/293 |
| 4,410,636 | 10/1983 | Minjolle et al. | 501/98 |

(List continued on next page.)

FOREIGN PATENT DOCUMENTS 076549 6/1977 Japan.
081250 5/1983 Japan.

OTHER PUBLICATIONS

Mangles, "Effect of Rate-Controlled Nitriding and Nitriding Atmospheres on the Formation of Reaction Bonded Si$_3$N$_4$" Ceramic Bulletin, vol. 60 No. 6 1981.
Sacks et al., Properties of Silicon Suspensions and Slip--Cast Bodies, 1985, 1109–1123.
Jahn, Processing of Reaction Bonded Silicon Nitride, 1989, 1–24.
Williams et al., Slip Casting of Silicon Shapes and Their Nitriding, 1983, pp. 607–619.
Moulson et al., Nitridation of High-Purity Silicon, 1975, pp. 285–289.
Shaw et al., Thermodynamics of Silicon Nitridation: Effect of Hydrogen, 1982, pp. 180–181.
Moulson, Reaction-bonded Silicon Nitride: its Formation and Properties, 1979, pp. 1017–1051.

Primary Examiner—Mark L. Bell
Assistant Examiner—Deborah Jones
Attorney, Agent, or Firm—P. S. Rulon; L. E. Cargill

[57] ABSTRACT

A process for making silicon powder or articles of manufacture such as an internal combustion engine valve by comminuting a homogeneous water-base slurry of silicon powder and at least one nitriding agent and permitting the slurry to chemically react for a time sufficient to enable the chemical reaction to substantially reach completion, then reducing the water content sufficiently to form a powder or an article and thence nitriding the article or powder by continuously varying the temperature over the range of 1000° C. to 1450° C. using a nitriding gas comprising nitrogen, hydrogen and helium and maintaining a constant nitriding gas composition throughout the nitriding cycle.

33 Claims, 2 Drawing Sheets

U.S. PATENT DOCUMENTS

| | | | |
|---|---|---|---|
| 4,443,394 | 4/1984 | Ezis | 264/65 |
| 4,471,060 | 9/1984 | Dickie et al. | 501/151 |
| 4,519,967 | 5/1985 | Crosbie et al. | 264/86 |
| 4,781,874 | 11/1988 | Edler | 264/65 |
| 4,810,678 | 3/1989 | Hirosaki et al. | 501/98 |
| 4,873,210 | 10/1989 | Hsieh | 501/98 |
| 4,888,142 | 12/1989 | Hayashi et al. | 264/65 |
| 4,891,342 | 1/1990 | Yokoyama | 501/98 |
| 4,902,653 | 2/1990 | Komatsu et al. | 501/98 |
| 4,943,401 | 7/1990 | Edler et al. | 264/63 |

PROCESS FOR MAKING SILICON NITRIDE AND POWDERS AND ARTICLES MADE THEREFROM

This application is a continuation-in-part of co-pending application U.S. Ser. No. 07/135,864, filed Dec. 21, 1987, now U.S. Pat. No. 4,943,401 and also relates to co-pending application U.S. Ser. No. 07/557,379, filed Jul. 24, 1990, now U.S. Pat. No. 5,055,432, U.S. Ser. No. 07/557,543, filed Jul. 24, 1990, now U.S. Pat. No. 5,079,198, U.S. Ser. No. 07/557,582, filed Jul. 24, 1990, now U.S. Pat. No. 5,156,830, U.S. Ser. No. 07/557,371, filed Jul. 24, 1990, U.S. Ser. No. 07/785,909, filed Nov. 4, 1991, now U.S. Pat. No. 5,160,719, and U.S. Ser. No. 07/557,382, filed Jul. 24, 1990.

INTRODUCTION

This invention relates generally to a process for making silicon nitride powder or articles of manufacture such as engine valves and more particularly to a reaction bonding process that utilizes a homogeneous water-based slurry of silicon powder and at least one nitriding agent as a starting material and includes a chemical reaction aging requirement as well as a compound schedule for heating the powder or article while blanketed under a nitriding gas effective to provide a quality high alpha-phase content silicon nitride article in a rapid and economical manner.

BACKGROUND OF THE INVENTION

Because of its high temperature strength and creep resistance and low thermal expansion as well as its excellent oxidation and corrosion resistance, silicon nitride ($Si_3N_4$) has been suggested for many years to make critically engineered parts such as gas turbine blades.

Generally, it has been the practice to form silicon nitride parts by "reaction bonding", "hot pressing" or by pressure or pressureless sintering processes. Reaction bonding typically comprises compacting silicon powder of commonly less than 400 mesh into the part commonly at ambient temperature and then exposing the part to nitrogen at temperatures in the range of 1100° C. to 1400° C. for periods of time sufficient to convert the silicon to silicon nitride such as disclosed in U.S. Pat. No. 4,235,857, the disclosure of which is incorporated herein by reference. Non-sintered reaction-bonded silicon nitride has an advantage in that the dimensions of the resultant silicon nitride body do not substantially change from the dimensions of the green body prior to nitriding. Non-sintered or sintered reaction-bonded silicon nitride can be used for seals, mechanical-wear parts, electrical insulators, refractory parts for furnaces (e.g., pallets, spacers), pump parts, computer discs, substrates for integrated circuits and engine valves or other engine components such as valves, rollers and pistons. Such is also reviewed by A. J. Moulson in an article titled "Review Reaction-Bonded Silicon Nitride: Its Formation and Properties," Journal-Materials Science, 14, (1979) 1017–1051 and by Mangels in an article titled "Effect of Rate-Controlled Nitriding and Nitriding Atmospheres on the Formation of Reaction-Bonded $Si_3N_4$", Ceramic Bulletin, Volume 60, No. 6 (1981), 613 in which he also described benefits derived by using a nitriding gas mixture of nitrogen with hydrogen and helium. The use of a combined nitrogen-hydrogen nitriding gas in the reaction bonding of $Si_3N_4$ is described by Shaw and Zeleznik in an article titled "Thermodynamics of Silicon Nitridation: Effect of Hydrogen", Communications of the American Ceramic Society, Nov. 1982, C180–C181 and the effect of temperature and nitrogen pressure on the kinetics of silicon nitridation along with the need for an activating agent such as iron is described by Atkinson, Moulson and Roberts in an article titled "Nitridation of High-Purity Silicon", Journal of the American Ceramic Society, Volume 59, No. 7-8, 285–289.

Hot pressing involves pressing alpha-silicon nitride powder into a shaped part at sintering temperatures of about 1700° C. to about 2200° C. for a prescribed period of time. In the "hot pressing" process, it has further been the practice to add "densification or sintering aids" to the silicon nitride powder to reduce porosity and improve strength. Pressureless sintering involves sintering of alpha-phase silicon nitride powder at temperatures between about 1650°–1800° C. while pressure sintered silicon nitride is sintered in the 1700°–2000° C. temperature range. Normally "densification or sintering aids similar to those used in hot pressing are added to the silicon nitride for sintering." Examples of densification or sintering aids include monovalent metal oxides such as MgO, ZrO, NiO and divalent metal oxides such as $Al_2O_3$, $Cr_2O_3$ and $Y_2O_3$ such as disclosed in U.S. Pat. No. 3,950,464, the disclosure of which is incorporated herein by reference.

It is also common to include nitriding agents in the "reaction bonding" process but those presently known to be suitable are much more limited than the "densification or sintering aids" previously described and generally include iron oxide or nickel oxide and mixtures thereof at the present time.

It has also been common practice to prepare the silicon or silicon nitride powder based compounds by mixing, commonly in a ball mill, with a wetting agent. Commonly such wetting agents have been members of the alcohol family such as tertiary alcohol disclosed in U.S. Pat. Nos. 3,991,166 and 3,992,497, the disclosures of which are incorporated herein by reference.

It has been less common to use water in preparing silicon or silicon nitride ceramic compounds but an example of the use of about 10% by weight water to fluidize a sinterable molding powder prior to freezing is disclosed in U.S. Pat. No. 2,869,215, the disclosure of which is incorporated herein by reference. U.S. Pat. No. 2,268,589, the disclosure of which is incorporated herein by reference, discloses an early use of water in forming a paste with activated silicon which is then fired at 1200° C. to 1450° C.

In addition to nitriding and densification agents, it has also been common practice to employ binders in the ceramic compounds to bind the silicon or silicon nitride powder particles together to enhance their forming into the parts being made. Examples of such binders include a mixture of butyl methacrylate and trichlorethylene disclosed in U.S. Pat. No. 3,819,786 in conjunction with silicon nitride powder and a blend of polyvinyl alcohol and water and a silicon carbide and berylium oxide blend disclosed in U.S. Pat. No. 3,205,080, the disclosures of which are incorporated herein by reference.

Up until the time of the present invention, it has been the further practice to nitride silicon powder by heating for long periods of time. An example of such is disclosed in U.S. Pat. No. 3,819,786, previously described, where a blend of silicon nitride powder and the binder mixture is heated in a stream of nitrogen from ambient to 1000° C. at 50° C./hr and then held under static nitrogen for 20 hours at 1350° C. and 10 hours at 1450° C. with the total time more than thirty hours long.

An example of a compound heating schedule for nitriding a mixture of silicon and silicon carbide powder is disclosed in U.S. Pat. No. 3,222,438, the disclosure of which is incorporated herein by reference, where the mixture is first compacted into a green compact and then heated in an atmosphere of nitrogen at a temperature of 1250° C. for 16 hours and then at 1450° C. for 3-4 hours where the first stage heating is conducted to pre-sinter the compound so that it doesn't melt at the 1450° C. temperature since the melting point of silicon is about 1420° C.

Finally, another example of a compound heating schedule for sintering a silicon nitride and MgO powder mixture is disclosed in U.S. Pat. No. 3,992,497, the disclosure of which is incorporated herein by reference, where the mixture is formed into a compact and then first heated at a temperature of about 600° C. for about 60 minutes to remove volatiles and then the temperature is increased to a temperature between 1500° C. and 1700° C. at a rate of climb above 1450° C. being about 15° C. to 200° C. per minute and holding it at that temperature for a period between about 5 and 30 minutes and more specifically teaching that the heating rate is immaterial until the temperature of about 1450° C. is attained.

Although it would be preferred to employ the reaction-bonding process to produce silicon-nitride articles because it uses relatively inexpensive silicon powder rather than expensive silicon nitride powder, the procedure is often not considered cost-effective due to the lengthy processing time (greater than 100 hours). Therefore, there is a need in the industry for an improved reaction-bonding process that substantially reduces process time and makes the reaction bonding process more economically favorable.

In addition, there is a need for a process for making silicon nitride powders and articles which uses only non-toxic materials. Non-toxic emissions and vapors are required for a safer work place and for an environmentally safe process for practice by the manufacturers. There is also a need for a process to produce silicon bodies for nitriding which are machinable without having to pre-sinter or pre-nitride. This would be particularly advantageous because the ability to machine the part before nitriding is very appealing from the viewpoint of a manufacturer.

The process of the present invention, although employing known binders and nitriding agents, utilizes relatively large amounts of water under prescribed conditions in providing a homogeneous slurry of silicon powder and at least one nitriding agent which is subsequently processed and formed into green stock which is then nitrided with a unique compound heating schedule incorporating a multi-component nitriding atmosphere to provide high alpha-phase contents silicon nitride powder or articles in a rapid and economical manner.

SUMMARY OF THE INVENTION

Accordingly, it is an object of this invention to provide a reaction bonding process for making high alpha-phase contents silicon nitride powder or articles.

It is another object of this invention to provide a reaction bonding process for making high alpha-phase content silicon nitride powder or articles that utilizes silicon powder as a starting material rather than the relatively expensive silicon nitride powder.

It is still another object of this invention to provide a reaction bonding process which is faster and, therefore, more economical, than prior art processes.

It is another object of this invention to provide an improved method for preparing silicon powder for nitriding so that the nitriding process takes minimal time and the resulting product contains high alpha-phase content silicon nitride.

Preferably, from about 0.5 to about 3 parts by weight of a nitriding agent for later enhancing the nitridation of the silicon powder is added to the slurry during the comminuting step. The nitriding agent may be selected from the group consisting of iron oxides, lead oxides, nickel carbonyl, nickel oxides, silicon carbide, graphite, carbon, aluminum oxides, CoO, CaF, $Li_2O$, $Na_2O$, $K_2O$, BaO, BN, albite ($NaAlSi_3O_8$), anorthite ($CaAl_2SI_2O_8$), nepheline synenite, talc, borax, soda ash, alpha-phase $Si_3N_4$, or other known nitriding aids, and mixtures thereof. The chemical reaction between the silicon and the water may be substantially completed during comminuting or during aging in the absence of comminuting, after the comminuting step.

In addition, organic materials, such as binders, lubricants, plasticizers, and viscosity modifiers may be added to the slurry to affect the physical properties of the silicon slurry mixture or resulting green body so that pumpability, machinability and other properties may be enhanced. Preferably, these organic binders are admixed to the slurry and comminuted with the slurry for at least 30 minutes at the end of the comminution step. The entire comminuting step is performed for at least 1 hour.

In accordance with the preferred embodiment of the invention, these and other objects and advantages are addressed as follows. A process for making high alpha-phase content silicon nitride according to the invention comprises the steps of (a) comminuting a homogeneous slurry comprising a mixture of about 10 to about 60 volume percent of silicon powder and any other solid additives included and about 90 to about 40 volume percent of water, to form fresh, non-oxidized surfaces on the silicon powder and to allow substantial chemical reaction between the silicon and the water; (b) reducing the water content of the reacted slurry to a degree sufficient to form a dry mass; and (c) nitriding the dry mass by exposure to a sufficient amount of a nitriding gas including at least nitrogen at a sufficient temperature for a sufficient length of time to form a mass of substantially silicon nitride.

If the organic materials are added, it is desirable for the process to include an additional step of preheating the dry mass before nitriding at a temperature from above room temperature up to about 1000° C. in a combustible gas atmosphere to burn off the added organic materials and remove volatiles. The rate of increasing temperature during the preheating step is chosen so as to substantially prevent damage to the dry mass.

In another aspect of the invention, a process for making high alpha-phase content silicon nitride is disclosed comprising the step of nitriding silicon powder by exposure to a nitriding gas in a furnace, wherein the nitriding gas maintains a substantially constant nitrogen composition throughout the nitriding step, the nitriding gas comprising from about 40 to about 60 mole percent helium, from about 40 to about 60 mole percent nitrogen, and from about 1 to about 4 mole percent hydrogen, wherein the total mole percent of the helium, nitrogen, and hydrogen equals 100 percent. Furthermore, it is desirable to perform the nitriding step while heating the silicon powder at a substantially linearly increasing temperature rate of from about 5° C. to about 50° C. per hour, more favorably from about 15° to about 25° C. per hour, until a temperature of about 1400° C. to about 1450° C. is reached. Superior results have been achieved when the composition of the nitriding gas remains substantially constant throughout the nitriding step by monitored addition of substantially pure nitrogen to the helium, hydrogen and nitrogen combination as the nitrogen is used up in the formation of silicon nitride from the elemental silicon.

Two particular advantages of the present invention over the prior art are (1) the use of comminution to react the silicon with the water, and (2) the ability of the resultant material to be nitrided in a furnace heated at a linear rate thereby saving a great amount of time. Although other prior art describes the use of comminution, it was performed to diminish the size of the silicon powder particles, and not to react the silicon with water. Previously the comminution was performed dry or with just enough water to stick the mass together, not with the large amount of water disclosed herein. Furthermore, the silicon-containing powder or article of the present invention may be linearly heated, without periods of temperature maintenance, due to the particular processing and combination of elements. This advantage is of great importance because it reduces the manufacturing time to a fraction of the prior art methods. Whereas prior art methods describe reaction furnace times of from about 120 hours (5 days) to 29 days, the resent invention may generally be practiced within several days for all the processes including comminuting reacting, aging, nitriding and processing. Therefore, the present invention brings the manufacture of quality silicon nitride powder and compacted articles well within the realm of commercial feasibility.

DESCRIPTION OF SOME PREFERRED EMBODIMENTS

Figure 1:
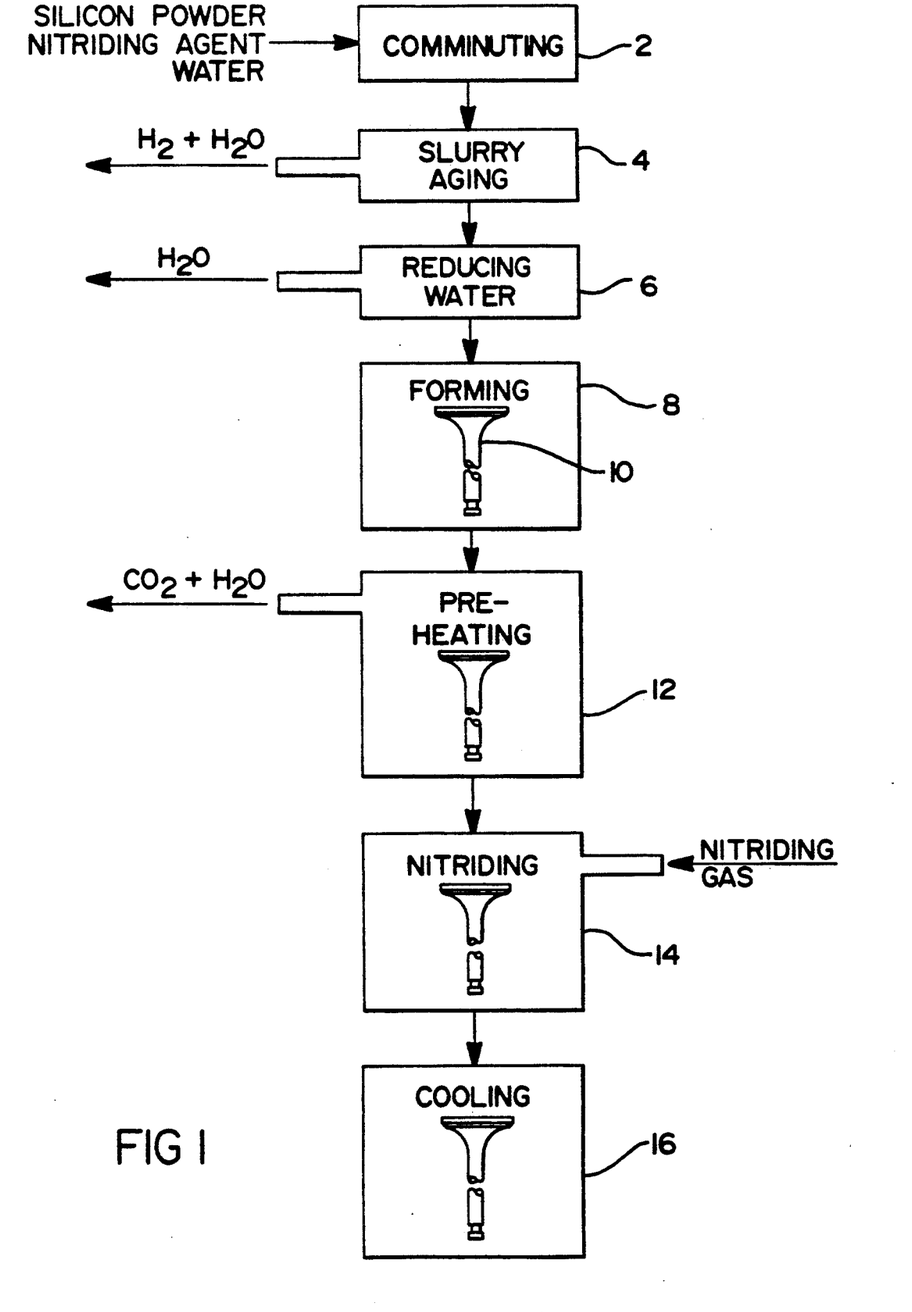
FIG. 1 is a block diagram of an embodiment of the process of the invention being utilized to make a silicon nitride engine valve for illustrative purposes.

An embodiment of the process of the invention is shown in FIG. 1 where the process starts by providing a homogeneous slurry of silicon powder, water and, preferably, at least one nitriding agent such as iron oxide predetermined as suitable to enhance nitriding of the silicon powder. The slurry is then comminuted to react the provided components. Any suitable comminutation device may be used, such as ball mills, rod mills, vibratory grinders, Union Process grinders, jet mills, cone grinders, jaw crushers, and hammer mills. The slurry is preferably prepared in a ball mill type mixer well known to those skilled in the art. The comminuting of the silicon in the presence of water is an important step of this invention, as the comminuting creates fresh, unoxidized surfaces in the silicon powder particles for vigorous reaction with the water. Merely mixing silicon powder, whether or not pre-ground, with water does not appear to create the fast, vigorous reaction that comminuting provides. Pre-ground silicon powder is not as reactive toward water because silicon, being a highly reactive metal, readily oxidizes in air during storage. Thus, a passivating layer of silicon oxide is formed on the outside surface of the silicon particles, thereby rendering the silicon not nearly as reactive as unoxidized silicon such as is created during the comminution step.

The slurry preferably comprises a mixture of about 40-60 parts by weight silicon powder and from about 60 to about 40 parts by weight water and from about 0.5 parts to about 3 parts by weight of the nitriding agent based on 100 parts of the combined silicon powder and added solids and water.

The slurry may additionally include effective amounts of suitable organic binders in conjunction with plasticizers and viscosity modifiers well known to those skilled in the art. Commonly, such organic binders, plasticizers and viscosity agents comprise less than about 5% by weight of the silicon powder. Binders are included in the silicon powder mixture to provide sufficient integrity to a compacted green body to allow machining of the green body before nitriding. Machining prior to nitriding has a significant benefit in that machining the part may be performed while it is in a softer stage. However, if machining is completed after nitriding, the machining would be made more difficult because the silicon nitride part is then extremely hard. The machining may be desired to be done before nitriding to achieve the desired final characteristics of the silicon nitride body, since nitriding the silicon does not significantly after the size or distort the part. Previously, silicon compacts were partially sintered or partially nitrided to provide them with sufficient strength to allow machining without danger of breaking the piece. After machining, the prior art method would then complete the sintering or the nitriding. The present invention obviates the need for such steps because the compact may be machined before nitriding. When proper amounts and types of binders are used, the pre-sintering or pre-nitriding of the prior art methods is not necessary, thereby saving a step in the process.

Lubricants may be added to (a) make any added plastic binders "softer" so that when a silicon compact is formed, the plastic binder more efficiently bonds together to form a strong compact, (b) lubricate the compact surface during machining operations so that the machine parts do not drag on the compacted part, and (c) provide mold and/or die release characteristics to a compacted part so that the compacted part may be easily removed from the mold and/or die. Viscosity modifiers and dispersants may be added to assist in the pumping of the silicon slurry out of the comminuting device into other containers or processing stations.

The amount of water and the amount of binder, and dispersing agents if included, can be tailored to provide the viscosity desired for the particular manner in which the article is to be formed. Generally, higher amounts of water, and dispersing agents will provide lower viscosities suitable for "slip casting" articles which is essentially pouring the mixture into molds shaped to form the article as is well known to those skilled in the art.

The nitriding agent comprises at least one of such agents predetermined to suitably enhance the nitriding operation hereinafter described. Preferably, the nitriding agent comprises at least one of iron oxide and nickel oxide of which iron oxide has been determined particularly suitable. After comminuting, the slurry is allowed to react further, with or without further comminuting, as indicated by the aging step 4 shown in FIG. 1.

After substantial completion of the reaction between the silicon and the water, indicated by the subsiding of frothing which occurs during the reaction of the slurry (as is more fully described hereinbelow), the slurry is then processed, as indicated at step 6 to reduce the water content of the slurry for forming a dry powder or a green body. In this step, most of the water is removed and, if powder is desired, the resultant dry powder can be formed by spray drying, although any other method of drying the slurry to a powder form could be contemplated. Thereafter, the dry powder may be formed into a compacted article or the slurry can be formed and dried. Slip casting, extrusion, injection molding, and tape casting are among the methods which may be utilized to accomplish the drying and forming of the silicon mixture. The compacting or forming step 8 is indicated in FIG. 1 wherein engine valve 10 is shown. Further machining on the green body may be performed at this stage.

If the dry powder or green body contains organic materials, such as binders, the dry powder or green body is then placed in a furnace to burn away the organics. The furnace is first purged with a combustible gas, such as hydrogen, and then heated as indicated by step 12. Preferably, this burn-off step is accomplished by heating the green bodies in a hydrogen atmosphere while the furnace temperature is increased from room temperature to about 1000° C. over a 2 hour time period, or for a sufficient length of time to volatilize substantially all of the organics. The volatile emissions and combustion products are non-toxic for the most part because carbon dioxide and water are the products given off when hydrogen is used as the combustible gas.

After the preheating burn-off step 12, the powder or silicon body is nitrided by heating in the presence of the nitriding gas, indicated by step 14.

Although molecular nitrogen gas may be used for nitriding the silicon, it is preferred that the gas comprises a mixture of from about 40% to about 60% helium on a mole basis, from about 60% to about 40%, on a mole basis, of nitrogen, and from about 1% to about 4% on a mole basis of hydrogen.

It has been discovered that helium greatly enhances the thermal conductivity of the gas and that hydrogen, both for purging and as a member of the nitriding gas, enhances the reaction converting silicon to silicon nitride which is believed to be a vapor phase reaction. The pressure of the nitriding gas is preferably controlled so that it blankets the article under a slight positive pressure such as a pressure of about 20 KPa gauge and nitrogen gas is admitted into the furnace to make up for gas loss during the nitriding procedure. Nitriding of the silicon body is accomplished by increasing the temperature of the furnace from about 1000° C. to approximately 1450° C. at the rate of 5° C. to about 50° C. per hour. Finally, the article is cooled to room temperature, as shown in step 16. It may be advantageous to process the article on a vibratory finisher to remove any light-colored surface coating. Processed powders, rather than compacted articles, may be manufactured utilizing the same above described processes.

Figure 2:
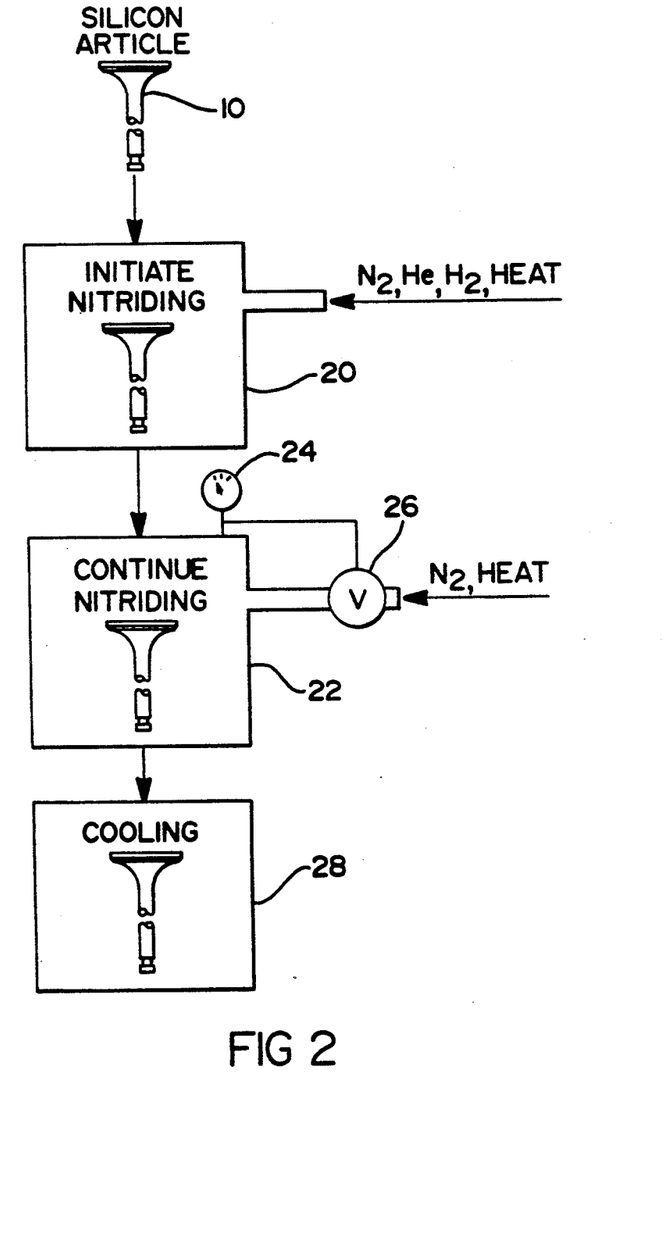
FIG. 2 is a block diagram of an embodiment of the invention illustrating the nitriding step in more detail.

FIG. 2 illustrates the nitriding step in more detail showing a green body 10 in the form of an engine valve being nitrided at 20 by subjecting the green body to heat and a nitriding gas consisting of nitrogen, helium, and hydrogen. As the nitrogen is consumed in the reaction with the silicon to form silicon nitride during the nitriding step 22, pure nitrogen is added through valve 26 to maintain a constant nitrogen partial pressure within the furnace, as indicated by gauge 24. After complete nitriding, the silicon nitride article is then cooled as indicated at 28.

A preferred embodiment of the process of the invention is hereinafter described in greater detail in which 45-50 Kg of finely-ground silicon powder of commercial purity, and obtained from a commercial source, is mixed with from 0.5-1.5 Kg of finely ground iron oxide ($Fe_2O_3$) or nickel oxide, also obtained from a commercial source, 50 grams of dispersing aids, and approximately 25-35 Kg of distilled water to form a slurry. The slurry is comminuted in a ball mill or other comminutation device for a time necessary to effect additional grinding of the silicon and iron oxide and/or nickel oxide to both further reduce the size of the silicon particles and to chemically activate the silicon so that it will vigorously react with the water and to assure complete distribution of the iron oxide throughout the silicon slip so that a homogeneous mixture results. The comminuting is performed by ball milling until the silicon powder size is predominantly less than 10 microns. Organic binders in conjunction with normal lubricants, plasticizers and viscosity modifiers, if employed, are preferably added to the ball mill approximately one hour before pumping the slip out of the mill. The silicon slip is aged for a time effective to enable a majority of the reaction to occur between the silicon and water which characteristically appears to be from about 12 to 24 hours. During aging, the slip appears to virtually double its volume through frothing. It is believed that the silicon is chemically reacting with the water during aging forming at a minimum, a silicon oxyhydrate coating on the silicon particles and releasing hydrogen gas. It has been found that the reaction subsides after approximately 12 hours with the slip developing thixotropic properties. Although the slip could be slip or tape cast at this point to form a green body or the water content reduced to permit extrusion or injection molding of shapes, it is preferred to spray dry the slip to obtain a homogeneous free flowing powder for isopressing or dry compression forming using standard powder metal presses. The use of standard binders common to the ceramics industry produces compacts with sufficient strength to allow machining without the need for special heat treatments which partially ntiride or sinter the silicon compact. The green silicon compacts are then loaded into a furnace operable to perform the nitridation of the silicon as hereinafter described.

The green silicon bodies are heated in a furnace to a temperature of about 600°-1000° C., while flowing a combustible gas, such as hydrogen, through the furnace. The heating rate during this portion of the cycle is controlled at a rate which will not cause damage to the dry mass of about 5000° C. per hour. The combustible gas which is flowing through the furnace is burned as it exists the furnace which is also effective to remove any organic binders from the furnace as they come out of the silicon compacts. Once the furnace temperature has reached the range of 600°-1000° C., the combustible gas is then turned off and the furnace purged with nitrogen until a non-combustible gas mixture is left in the furnace whereupon the furnace atmosphere is replaced with the nitriding atmosphere. The furnace is caused to come to a temperature hold when it reaches about 1000° C. until the furnace atmosphere replacement has been accomplished. The nitriding atmosphere pressure is about 120-135 KPa absolute with the nitriding gas consisting of about 40-60 mole percent helium, about 40-60 mole percent nitrogen, and about 1-4 mole percent hydrogen, wherein the total mole percent of the helium, nitrogen, and hydrogen equals 100 percent. The inlet line to the furnace is then switched to a cylinder of high purity nitrogen which will replace the nitrogen consumed during the nitriding of the silicon. Unlike Mangels' demand nitriding cycle previously described hereinabove in which the composition of the nitriding atmosphere changes during nitriding, the preferred nitriding atmosphere of the process of the present invention remains constant in chemical composition throughout the nitridation of the silicon. Once the backfilling of the furnace with the nitriding gas begins, an increasing temperature ramp, preferably substantially linear of 5° to 50° C. per hour, particularly 15°-25° C. is initiated to run the furnace to a temperature of approximately 1400° C. to 1450° C., preferably about 1420° C. This invention has the advantage of allowing relatively rapid, linear heating during nitridation (5°-50° C. per hour) without resulting in too rapid a reaction and consequent melting of the silicon, as has been experienced in the prior art. In prior art methods, linear heating was not available because it caused overheating. Temperature plateaus were required to alleviate overheating. These plateaus cause great time delay and result in longer manufacturing times. Linear heating has a distinct advantage in that the reaction occurs much more quickly, thereby increasing the commercial feasibility of manufacturing silicon nitride.

It is believed that two features of the present invention help to prevent such an overheating reaction from occurring. The first feature believed to prevent overheating is the presence of reaction product from the silicon-water chemical reaction resultant from comminution remaining in the silicon green body or powder during the nitridation step, thereby reducing the reactivity of the silicon toward nitriding. The second feature is the use of helium in the nitriding gas. Helium has a relatively high thermal conductivity which is believed to greatly assist in removing the heat from the reaction sites, so that the occurrence of localized hot spots is reduced during the reaction. A one-hour soak period at 1420° C. is allowed before cooling to room temperature. A second important difference between the preferred nitriding cycle of the process of the invention and others is that the furnace temperature is virtually continuously increasing from a temperature of approximately 1000° C. to the melting point of silicon (1420° C.) with the only temperature hold occurring at the end of the cycle. A significant result of the process of the invention is that it is readily adaptable to a continuous type of kiln similar to a tunnel kiln, not just batch kilns as are normally used in the manufacture of reaction bonded silicon nitride.

Using the above-described process for the manufacture of reaction bonded silicon nitride, test bars have been made with 4-point modulus of rupture (MOR) strengths of 280 MPa with an average strength of 240 MPa. X-ray diffraction analysis did not reveal free silicon in the test bars, and optical microscopy indicates a 98+% conversion of silicon. The silicon nitride prepared by the method of this invention is predominantly in the alpha-phase, typically on the order of 70-100% alpha-phase material.

The following is a typical procedure according to the invention:

Added together in a ball mill are: (1) 100 pounds commercial grade silicon metal powder ground to approximately 2.3 F.A.D. (Fisher Average Diameter) or finer, which is substantially less than 20 micron size; (2) 3 pounds micron size iron oxide $Fe_2O_3$; (3) 68 pounds distilled water; and (4) 50 grams of dispersing aid, Darvan No. 1, a registered trademark of the R.T. Vanderbilt Company, Inc. This slurry mixture is comminuted for 3 hours while venting the evolving gases (hydrogen and water vapor) every hour. Then 1½ pounds polyvinylalcohol (available from Air Products, Inc., Allentown, Pa.), ½ pound polyethylene glycol (CARBOWAX 1000 available from Union Carbide Corporation, New York, N.Y.), ¼ pound xanthan gum (KELZAN, available from Kelco, a division of Merck & Co., Inc., Rahway, N.J.), and 1 pound food grade glycerol are added to the slurry in the ball mill and comminution is continued for about 1 hour. These organic additives have an added advantage in that they are all food grad materials, thus posing greatly reduced toxicity problems over prior art methods.

After ball milling, the slurry is pumped into a holding tank, covered loosely to allow evolving gases to escape, and aged overnight to allow the majority of the reaction between the silicon and the water to occur. The reaction is evidenced by substantial frothing which is reduced by morning.

The reacted slurry is transferred into a circulating tank and continuously circulated to keep the viscosity low by shearing, thereby keeping the slurry from gelling due to the presence of the xanthan gum.

The slurry is then pumped into a spray dryer, and spray-dried. The collected spray-dried granules are screen-separated into three distinct particles size ranges. The particles that are greater than 30 mesh in size are set aside for recycling. The fine particles of less than 200 mesh are isopressed in an isopress machine to produce billets. The spray-dried granules of a size between 30 and 200 mesh are put into a dry press and pressed into green body parts. Due to the addition of the organic materials, the green body parts are easily machinable after isopressing or dry pressing without having to pre-sinter or pre-nitride to add strength to the silicon body. The pressed parts are then racked on saggers and put into a furnace.

The furnace is evacuated to −100 KPa and then filled with pure hydrogen gas. The temperature of the furnace is then increased from room temperature to 1000° C. over a two hour period by a nearly linear progression of increasing temperature while flowing hydrogen through the furnace at atmospheric pressure to burn off the organic materials. The substantially non-toxic effluent which is vented includes carbon dioxide and water.

The furnace is purged with flowing nitrogen to obtain a noncombustible atmosphere and then evacuated again to remove the nitrogen and any remaining effluent. Helium gas is added until a pressure of 50 KPa absolute is indicated. Then a nitrogen-hydrogen gas blend consisting of 4 weight percent hydrogen and 96 weight percent nitrogen is admitted to the furnace until the pressure is slightly above atmospheric pressure (approximately 120 KPa absolute) to avoid any leakage of ambient air into the furnace. The resulting composition of the nitriding gas constituents nitrogen, helium and hydrogen in the nitriding gas are 48%, and 50% and 2%, respectively.

The temperature is then preferably increased from 1000° C. to about 1420° C. at a linear rate of about 20° C. per hour. During this heating cycle, nitrogen is consumed by the silicon to form silicon nitride. The nitriding gas composition in the furnace atmosphere is kept constant by admitting pure nitrogen gas into the furnace to maintain the slightly greater than atmospheric pressure. Once 1420° C. is reached, the temperature is maintained for 1 hour; then the heat source is shut off and the reaction bonded silicon nitride articles are allowed to cool. Samples prepared by this method display excellent properties, low size distortion and high material integrity.

Test bars of the reaction bonded silicon nitride may be made having dimensions of 0.100×0.320×2.25 inches. In four-point modulus of rupture tests of such bars using conditions consisting of a lower span of 1.75 inches and an upper span of 0.60 inches with a loading rate of 0.02 inches/minute, typical values for the density, the average four-point modulus of rupture (MOR), and the range of MOR strengths are provided in Table 1.

TABLE 1

| Density (gm/cc) | 4-Point MOR Averages (Kpsi*) | 4-Point MOR Range (Kpsi) |
| --- | --- | --- |
| 2.8–2.9 | 31–36 | 27–42 |

*Kpsi = Thousands of pounds per square inch.

Thus, by means of chemically reacting a slurry of silicon powder and water in conjunction with at least one nitriding agent and then nitriding the powder or articles formed therefrom under a compound heating schedule, a process is provided by which to make high alpha-phase content silicon nitride powder or articles of high quality in a rapid and economical manner. While our invention has been described in terms of a specific embodiment, it will be appreciated that other embodiments could readily be adapted by one skilled in the art. Accordingly, the scope of our invention is to be limited only by the following claims.

What is claimed is:

1. A process for making high alphaphase content silicon nitride, comprising:
   (a) comminuting a slurry comprising a mixture of about 10 to about 60 volume percent of silicon powder and about 90 to about 40 volume percent of water, to form fresh, non-oxidized surfaces on the silicon powder and to allow substantial chemical reaction between the silicon and the water;
   (b) reducing the water content of the reacted slurry to a degree sufficient to form a dry mass; and
   (c) nitriding the dry mass by exposure to a nitriding gas including at least nitrogen to form a mass of substantially silicon nitride.

2. The process of claim 1, wherein from about 0.5 to about 3 parts by weight of a nitriding agent for later enhancing the nitridation of the silicon powder is added to the slurry during the comminuting step.

3. The process of claim 2, wherein said at least one nitriding agent comprises an agent selected from the group consisting of iron oxides, lead oxides, nickel carbonyl, nickel oxides, silicon carbide, carbon, aluminum oxides CoO, CaF, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, alpha-phase $Si_3N_4$ and other known nitriding agents and mixtures thereof.

4. The process of claim 1, further comprising a step of aging the comminuted slurry in the absence of comminuting for a period of time sufficient to allow the chemical reaction to be substantially completed.

5. The process of claim 1, further comprising admixing organic materials selected from the group consisting of binders, lubricants, plasticizers, and viscosity modifiers including dispersing agents.

6. The process of claim 5, wherein said admixing is accomplished by comminuting the slurry with the organic materials for at least 30 minutes after said organic materials are admixed.

7. The process of claim 1, further comprising the step of at least periodically venting the evolving gases from the reacting slurry.

8. The process of claim 1, wherein said comminuting is performed by a method selected from the group consisting of ball milling, rod milling, vibratory grinding, jet milling, cone grinding, jaw crushing, and hammer milling.

9. The process of claim 1, wherein said comminuting is performed by ball milling.

10. The process of claim 1, wherein said comminuting is performed until the silicon powder size is predominantly less than 10 microns.

11. The process of claim 1, wherein said comminuting is performed for greater than two hours.

12. The process of claim 1, further comprising admixing a dispersing aid into the slurry in the comminuting step.

13. The process of claim 1, wherein reducing the water content is performed by a method selected from the group consisting of spray drying, slip casting, extrusion, injection molding, and tape casting.

14. The process of claim 1, further comprising the step of forming the resulting dry mass into an article before exposing the article to the nitriding gas.

15. The process of claim 14, wherein said forming is performed by a method selected from the group consisting of isopressing, dry pressing, extruding, and injection molding.

16. The process of claim 1, further comprising the step of pre-heating the dry mass before nitriding at a temperature from above room temperature up to about 1000° C. in a combustible gas atmosphere at a rate of increasing temperature effective to prevent damage to the dry mass while removing volatile materials by burning off the organic materials.

17. The process of claim 1, wherein said combustible gas atmosphere includes hydrogen so that substantially non-toxic effluent is released from burning off the organic materials.

18. The process of claim 1, wherein said nitriding step is performed while heating at an increasing temperature rate of from about 5° C. to about 50° C. per hour until an elevated temperature of about 1400° C. to about 1450° C. is reached.

19. The process of claim 18, wherein the increasing temperature rate during nitriding is substantially linear.

20. The process of claim 18, wherein the temperature rate is a 15°–25° C. increase per hour.

21. The process of claim 18, further comprising holding the temperature between about 1400° C. to about 1450° C. for less than 2 hours.

22. The process of claim 1, wherein said nitriding gas comprises from about 40 to about 60 mole percent helium, from about 40 to about 60 mole percent nitrogen, and from about 1 to about 4 mole percent hydrogen.

23. The process of claim 1, wherein the composition of the nitriding gas remains substantially constant throughout the nitriding step by monitored addition of pure nitrogen.

24. A method of preparing silicon for nitriding, comprising:
   (a) comminuting a slurry comprising a mixture of about 10 to about 60 volume percent of silicon powder and about 90 to about 40 volume percent of water to form fresh, non-oxidized surfaces on the silicon powder and to allow a substantial chemical reaction between the silicon and the water; and
   (b) reducing the water content of the reacted slurry to a degree sufficient to form a dry mass suitable for nitriding.

25. The process of claim 24, wherein from about 0.5 to about 3 parts by weight of a nitriding agent selected from the group consisting of iron oxides, lead oxides, nickel carbonyl, nickel oxides, silicon carbide, carbon, aluminum oxides, CoO, CaF, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, alpha-phase $Si_3N_4$ and other known nitriding agents and mixtures thereof for later enhancing the nitridation of the silicon powder is added to the slurry during the comminuting step.

26. The process of claim 24, further comprising aging the comminuted slurry in the absence of comminuting for a period of time sufficient to allow the chemical reaction to be substantially completed.

27. The process of claim 24, further comprising admixing organic materials selected from the group consisting of binders, lubricants, plasticizers, and viscosity modifiers including dispersing agents.

28. The process of claim 27, wherein said comminuting is performed for at least 30 minutes after said organic materials are admixed.

29. The process of claim 24, wherein said reducing the water content is accomplished by slip casting.

30. The method of claim 24, further comprising the step of forming the resulting dry mass into a green body.

31. The process of claim 24, wherein said comminuting is performed by a method selected from the group consisting of ball milling, rod milling, vibratory grinding, jet milling, cone grinding, jaw crushing, and hammer milling.

32. The process of claim 24, wherein said comminuting is performed until the silicon powder size is predominantly less than 10 microns.

33. A process for making high alpha-phase content silicon nitride, comprising:
   (a) comminuting a homogeneous slurry comprising a mixture of about 10 to about 60 volume percent of silicon powder, about 90 to about 40 volume percent of water, and from about 0.5 to about 3 parts by weight of nitriding agent selected from the group consisting of iron oxides, lead oxides, nickel carbonyl, nickel oxides, silicon carbide, carbon, aluminum oxides, other known nitriding agents and mixtures thereof, for later enhancing the nitridation of the silicon powder, to form fresh, non-oxidized surfaces on the silicon powder;
   (b) aging the comminuted slurry in the absence of comminuting for a period of time sufficient to allow the chemical reaction between the silicon and the water to be substantially completed;
   (c) reducing the water content of the reacted slurry to a degree sufficient to form a dry mass; and
   (d) nitriding the dry mass by exposure to a nitriding gas containing from about 40-60 mole percent helium, from about 1-4 mole percent hydrogen, and from about 40-60 mole percent nitrogen, and the nitriding gas composition remains substantially constant throughout the nitriding step by monitored addition of pure nitrogen while heating the dry mass at a substantially linearly increasing temperature rate of about 15° C. to about 25° C. per hour until a temperature of about 1400° c. to about 1450° C. is reached.

* * * * *